United States Patent
Ezumi et al.

(10) Patent No.: US 7,243,471 B2
(45) Date of Patent: Jul. 17, 2007

(54) FRICTION STIR WELDING METHOD, AND HOLLOW SHAPE MEMBER FOR FRICTION STIR WELDING

(75) Inventors: Masakuni Ezumi, Yamaguchi (JP); Kazushige Fukuyori, Yamaguchi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/371,273

(22) Filed: Feb. 24, 2003

(65) Prior Publication Data

US 2003/0124375 A1    Jul. 3, 2003

Related U.S. Application Data

(62) Division of application No. 10/054,852, filed on Jan. 25, 2002, now Pat. No. 6,793,117.

(30) Foreign Application Priority Data

Apr. 16, 2001    (JP)    ............................. 2001-117050

(51) Int. Cl.
  *E04C 3/04*    (2006.01)
  *E04C 2/08*    (2006.01)
  *B23K 20/12*   (2006.01)
(52) U.S. Cl. .................... 52/592.1; 403/270; 403/271; 105/396; 105/397; 228/2.1; 228/112.1
(58) Field of Classification Search .................. 52/633, 52/690, 692, 735.1, 731.6, 223.8, 223.9, 52/223.11, 223.12, 693, 578, 591.1, 592.1, 52/793.1; 228/2.1, 112.1; 105/396, 397; 428/599; 403/270, 271
See application file for complete search history.

(56) References Cited

U.S. PATENT DOCUMENTS

| 2,450,010 | A | * | 9/1948 | Mason ........................ 310/360 |
| 3,236,017 | A | * | 2/1966 | Doering ........................ 52/579 |
| 3,385,182 | A | * | 5/1968 | Harvey ........................ 404/35 |
| 3,984,961 | A | * | 10/1976 | Chieger et al. ............. 52/592.1 |
| 5,050,362 | A | * | 9/1991 | Tal et al. .................... 52/588.1 |
| 5,681,093 | A | * | 10/1997 | Pfister .................... 297/452.65 |
| 5,810,507 | A | * | 9/1998 | Ahlskog et al. .............. 404/53 |
| 5,901,396 | A | * | 5/1999 | Ahlskog et al. ............. 14/77.1 |
| 6,050,474 | A | * | 4/2000 | Aota et al. ............... 228/112.1 |

(Continued)

FOREIGN PATENT DOCUMENTS

EP    1 188 507 A2    *    3/1997

(Continued)

OTHER PUBLICATIONS

European Search Report dated Oct. 21, 2004.

(Continued)

*Primary Examiner*—Robert Canfield
(74) *Attorney, Agent, or Firm*—Antonelli, Terry, Stout & Kraus, LLP.

(57) ABSTRACT

Face plates 11 and 12 of a hollow shape member 10 are abutted against face plates 21 and 22 of a hollow shape member 20. Grooves 18 formed to said face plates 11 and 12 at the abutted region receive projections 28 formed to said face plates 21 and 22. A connecting plate 14 orthogonal to said face plates 11 and 12 is provided to the hollow shape member 10. There is no connecting plate orthogonal to face plates 21 and 22 disposed on the end of the hollow shape member 20. Friction stir welding heat causes the face plate 21 (22) to move toward the thickness direction of hollow shape members 10 and 20, but such movement is suppressed by the groove 18 and projection 28. Thereby, the abutted region is welded flatly. Since the hollow shape member 20 requires no connecting plate corresponding to plate 14, the welded members are light in weight.

13 Claims, 3 Drawing Sheets

U.S. PATENT DOCUMENTS

| | | | |
|---|---|---|---|
| 6,193,137 B1 * | 2/2001 | Ezumi et al. | 228/112.1 |
| 6,250,037 B1 * | 6/2001 | Ezumi et al. | 52/592.1 |
| 6,413,610 B1 * | 7/2002 | Nakamura et al. | 428/98 |
| 6,532,712 B2 * | 3/2003 | Kawasaki et al. | 52/693 |
| 6,568,872 B2 * | 5/2003 | Kawasaki et al. | 403/271 |
| 6,581,819 B1 * | 6/2003 | Aota et al. | 228/112.1 |
| 6,582,832 B2 * | 6/2003 | Kawasaki et al. | 428/599 |
| 6,698,153 B2 * | 3/2004 | Ezumi et al. | 52/690 |
| 6,722,286 B2 * | 4/2004 | Okamura et al. | 105/396 |
| 6,793,117 B2 * | 9/2004 | Ezumi et al. | 228/112.1 |
| 6,936,332 B2 * | 8/2005 | Aota et al. | 428/156 |
| 2003/0042293 A1 * | 3/2003 | Ezumi et al. | 228/112.1 |
| 2003/0124376 A1 * | 7/2003 | Ezumi et al. | 428/544 |

FOREIGN PATENT DOCUMENTS

| | | |
|---|---|---|
| EP | 0 797 043 | 9/1997 |
| EP | 0 893 189 | 1/1999 |
| JP | 9-309164 | 12/1997 |
| JP | 11-90655 | 4/1999 |
| JP | 11-267859 | 10/1999 |
| JP | 11267859 | 10/1999 |
| JP | 11-320130 | 11/1999 |
| JP | 11320130 | 11/1999 |
| JP | 2000-000681 | 1/2000 |
| JP | 2000-681 * | 7/2000 |
| JP | 2003-94179 * | 2/2003 |
| JP | 2003-311443 * | 5/2003 |
| KR | 1999-01339 | 2/1999 |

OTHER PUBLICATIONS

European Search Report, dated Aug. 2, 2006, for Application No. 06 01 1182.

European Search Report, dated Aug. 2, 2006, for Application No. 06 01 1183.

* cited by examiner

Fig. 1

10, 20: HOLLOW SHAPE MEMBER
11, 12, 21, 22: FACE PLATE
14: CONNECTING PLATE
50: ROTARY TOOL

FRICTION STIR WELDING METHOD, AND HOLLOW SHAPE MEMBER FOR FRICTION STIR WELDING

This application is a Divisional application of prior application Ser. No. 10/054,852, filed Jan. 25, 2002, which issued as U.S. Pat. No. 6,793,117, the contents of which are incorporated herein by reference in their entirety.

FIELD OF THE INVENTION

The present invention relates to a friction stir welding method that is especially preferable for welding hollow shape members, and to hollow shape members suitable for such friction stir welding method.

DESCRIPTION OF THE RELATED ART

Friction stir welding is a method performed by rotating and inserting a round shaft (called a rotary tool) to a joint region between members to be welded, and moving the same along the joint line, thereby heating, softening, plasticizing, and solid-phase welding the joint region. The rotary tool comprises a large-diameter portion and a small-diameter portion. The small-diameter portion is inserted to the member(s) to be welded, and the end surface of the large-diameter portion is disposed so as to contact the member(s). The small-diameter portion is provided with a screw thread.

Projections protruding to the side from which the rotary tool is inserted are formed to the two members to be welded, and the metal material constituting the projections is used as the source material to fill the gap between the two members. The large-diameter portion of the rotary tool is inserted to the projections.

Since the rotary tool is inserted to the metal material at the abutted region, a great force is added to the joint region. Therefore, upon welding hollow shape members, the area of one hollow shape member where a connecting plate that connects the two face plates exists is selected to be welded with the other hollow shape member. This is because the connecting plates can provide support against the above-mentioned force, thereby preventing deformation of the hollow shape members during the friction stir welding.

The above mentioned prior art method is disclosed in Japanese Patent Laid-Open Publication Nos. 9-309164 (309164/97, EP 0797043A2), and 11-90655 (90655/99, U.S. Pat. No. 6,050,474).

When welding (or friction stir welding) the joint region between two abutted plates, the plates are deformed by the weld heat. One example of such deformation is the deformation in the thickness direction of the plates. Such deformation may cause unevenness between one plate and the other plate being welded, deteriorating the flatness of the plate surface. Therefore, in welding hollow shape members, the members being welded is equipped with a connecting plate that connects the two parallel face plates positioned near the joint region to be welded, thus preventing the face plates from deforming in the thickness direction. Such connecting plate is positioned near the weld region of each hollow member. The connecting plate is orthogonal to the face plates.

The welding temperature of the friction stir weld is low compared to arc welding, so there is less fear of deformation, but deformation still occurs. Therefore, connecting plates are provided to the weld region according to the above-mentioned JP Laid-Open Publications No. 309164/97 (EP 0797043A2) and No. 90655/99 (U.S. Pat. No. 6,050,474).

According to the disclosure of 90655/99 (U.S. Pat. No. 6,050,474), each of the hollow shape members being welded are provided with a connecting plate positioned at the end region thereof. Though the connecting plates are required to provide necessary strength to the hollow shape members, the connecting plates also inevitably increase the mass of the members.

In 309164/97 (EP 0797043A2), only one of the two hollow shape members being friction stir welded is provided with the connecting plate.

The object of the present invention is to provide a friction stir welding method that realizes a good weld with a light-weight member, and a hollow shape member used for such method.

SUMMARY OF THE INVENTION

The first method for achieving the objects of the present invention characterizes in that an end portion in the width direction of a first hollow shape member is abutted against an end portion in the width direction of a second hollow shape member; the first hollow shape member comprises two face plates; a first connecting plate for connecting the two plates, at least one end of which is connected to a region other than the end portion; a second connecting plate for connecting the end portions of the face plates that is disposed substantially orthogonal to the face plates; recessed portions formed respectively to connecting portions where the two face plates are each connected with the second connecting plate, each recessed portion opening outward toward both the width direction and the thickness direction of the hollow shape member; a groove or projection formed to one recessed portion; and a groove or projection formed to the other recessed portion; the second hollow shape member comprises two face plates; a first connecting plate for connecting the two plates, at least one end of which is connected to a region other than the end portion; a projection or groove formed to one face plate at the end portion of the hollow member; and a projection or groove formed to the other face plate at the end portion of the hollow member; the projections are each inserted to a corresponding groove, respectively, when the two hollow members are abutted against each other, at which time one hollow shape member is inserted to the other hollow shape member so as to substantially suppress movement of the hollow shape member in the thickness direction; and a rotary tool is disposed on the extension of plate thickness of the second connecting plate, thereby friction stir welding the abutted region from the outer direction of thickness of the hollow shape members.

The second method for achieving the objects of the present invention characterizes in that an end portion in the width direction of a first hollow shape member is abutted against an end portion in the width direction of a second hollow shape member; the first hollow shape member comprises two face plates; a first connecting plate for connecting the two plates, at least one end of which is connected to a region other than the end portion; a second connecting plate for connecting the end portions of the face plates that is disposed substantially orthogonal to the face plates; recessed portions formed respectively to connecting portions where the two face plates are each connected with the second connecting plate, each recessed portion opening outward toward both the width direction and the thickness direction of the hollow shape member; a groove or projection formed to one recessed portion; and a groove or projection formed to the other recessed portion; the second hollow shape member comprises two face plates; a first connecting plate for connecting the two plates, at least one end of which is connected to a region other than the end portion; one face plate having at the end portion of the hollow shape member either a projection protruding outward to the width direction of the hollow shape member or a groove opening outward to that direction; and the other face plate having at the end portion of the hollow shape member either a projection protruding outward to the width direction of the hollow shape member or a groove opening outward to that direction; the projections are each inserted to a corresponding groove, respectively, when the two hollow members are abutted against each other; and a rotary tool is disposed on the extension of plate thickness of the second connecting plate, thereby friction stir welding the abutted region from the outer direction of thickness of the hollow shape members.

The third method achieving the objects of the present invention characterizes in that an end portion in the width direction of a first hollow shape member is abutted against an end portion in the width direction of a second hollow shape member; the first hollow shape member comprises two face plates, the two plates each having either a groove opening toward the width direction or a projection protruding toward the width direction, formed at one width-direction-end of the first hollow shape member; the second hollow shape member comprises two face plates, the two face plates each having either a projection protruding toward the width direction or a groove opening toward the width direction, formed at one width-direction-end of the second hollow shape member; the projections are each inserted to a corresponding groove, respectively, when the two hollow members are abutted against each other; and the friction stir welding is performed to weld said abutted regions, and the grooves and the projections.

Moreover, one hollow shape member for achieving the objects of the present invention comprises two face plates; a first connecting plate for connecting the two face plates, at least one end of which is connected to a region other than an end portion in the width direction of the hollow shape member; a second connecting plate for connecting the end portions of the two face plates, disposed substantially orthogonal to the face plates; recessed portions provided respectively to each of the two connecting portions where the two face plates are connected with the second connecting plate, each recessed portion opening outward toward both the width direction and the thickness direction of the hollow shape member; and either grooves opening toward the outer direction of width or projections protruding toward the outer direction of width formed to the recessed portions, respectively.

The other hollow shape member for achieving the object of the present invention comprises two face plates; a connecting plate for connecting the two face plates, at least one end of which is connected to a position other than an end portion in the width direction of the hollow shape member; either a projection protruding toward or a groove opening toward the outer direction of width of the hollow shape member, provided to the end of a first face plate at the end portion in the width direction of the hollow shape member; and either a projection protruding toward or a groove opening toward the outer direction of width of the hollow shape member, provided to the end of a second face plate at the end portion in the width direction of the hollow shape member.

DETAILED DESCRIPTION OF THE PREFERRED EMBODIMENT

Figure 2:
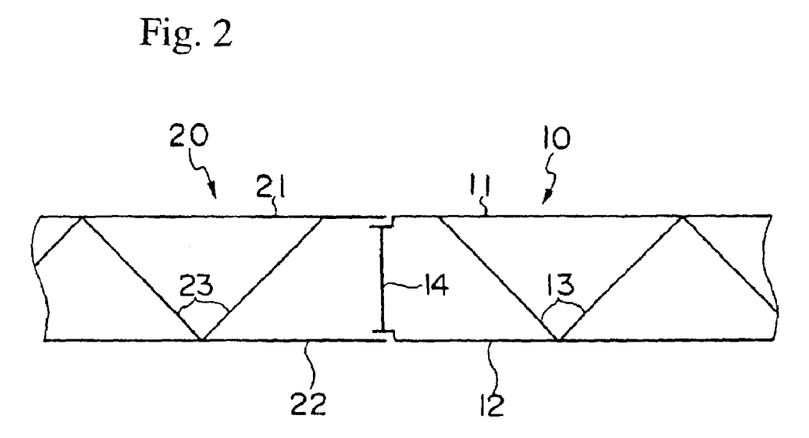
FIG. 2 is a vertical cross-sectional view showing the whole joint region of the hollow shape members of FIG. 1.
Figure 3:
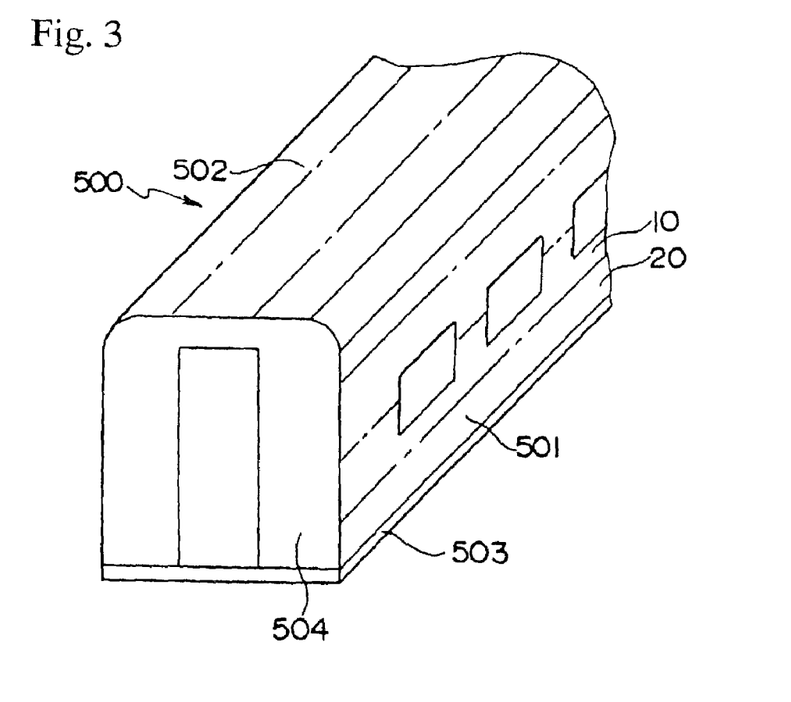
FIG. 3 is a perspective view showing the car body of the railway car.

The first embodiment of the present invention will be explained with reference to FIGS. 1 to 3. A car body 500 of a railway car comprises side structures 501 that constitute the sides thereof, a roof structure 502 that constitutes the roof thereof, an underframe 503 that constitutes the floor thereof, and end structures 504 that define the longitudinal ends thereof. The side structures 501, the roof structure 502, and the underframe 504 are each formed by welding plural extruded members 10, 20. A plural number of extruded members are arranged along the periphery of the car body 500, with the longitudinal direction (extruded direction) of the extruded members 10 and 20 oriented along the longitudinal direction of the car body 500. The extruded members 10 and 20 are hollow shape members made of aluminum alloy.

The joint region between the hollow shape members 10 and 20 constituting the side structure 501 will now be explained. The joints between the hollow shape members of other portions are formed in a similar manner.

The hollow shape member 10 (20) comprises two substantially parallel face plates 11 (21) and 12 (22), and plural connecting plates 13 (23) and 14 that connect the two face plates. The connecting plates 13 (23) are sloped against the face plates 11 (21) and 12 (22). In other words, the face plates 11 (21) and 12 (22) and the connecting plates 13 (23) are arranged in trusses. According to where the hollow shape member 10 or 20 is to be placed, one of the face plates 11 (21) can be sloped or curved in an arc-shape against the other face plate 12 (22), or even the whole hollow shape member can be curved in an arc-shape.

The connecting plate 14 positioned at the width-direction-end of the hollow shape member 10 is substantially orthogonal to the face plates 11 and 12. However, the hollow shape member 20 does not have a connecting plate orthogonal to the face plates 21 and 22 at the end portion thereof. The connecting portions where the connecting plate 14 come into contact with the face plates 11 and 12 are provided with recessed portions that receive the end portion of the face plates 21 and 22 of the hollow shape member 20. Each connecting portion is provided with a protruded block 15 that supports the face plate 21 or 22. The protruded block 15 is protruded from the connecting plate 14 toward the width-direction-end of the hollow shape member 10. The recessed portion is defined by the face plate 11 (12), the connecting plate 14, and the protruded block 15. The recessed portion is opened outward toward the width direction and the thickness direction of the hollow shape member 10. When face plates 21 and 22 are placed (superposed) on the recessed portions, the end surface of the face plates 21, 22 and the end surface of the face plates 11, 12 are abutted against each other.

The face plates 11 and 12 (21 and 22) are each provided with a projection 17 (27) that protrudes outward to the direction of thickness of the hollow shape members 10 and 20 at the end portion thereof, respectively. The end surface of the face plates 11 and 12 (21 and 22) and the end surface of the projection 17 (27) are arranged along the thickness direction of the hollow shape member 10 (20). The end surfaces of the face plates 11, 12 and the projections 17 formed thereto (the width-direction-end of the hollow shape member 10) are disposed on the extension of the center line of thickness C of the connecting plate 14. The end surface of the face plates 21, 22 and the projections 27 formed thereto are also disposed on the extension of the thickness center C of the connecting plate 14.

When the hollow shape members 10 and 20 are assembled, the end surfaces of the face plates 11, 12, 21 and 22 and projections 17, 17, 27 and 27 are all disposed on the extension of the thickness center C of the connecting plate 14. According to this assembly, the end surface of the face plate 11 (12) and the projection 17 (17) of the hollow member 10 is abutted against the end surface of the face plate 21 (22) and the projection 27 (27) of the hollow shape member 20. The hollow shape members are designed so that when member 10 and 20 are abutted against each other, the gap formed at the abutted portion is minimum. In other words, the space formed between the face plates 21, 22 and the recessed portions is determined in advance.

When the hollow shape members 10 and 20 are abutted against each other, the outer surface of the face plates 11 and 12 are flush with the outer surface of the face plates 21 and 22, and the protruding height of the projections 17 and 27 are equal. The width of the two projections 17 and 27 are also equal. The total width of the two projections 17 and 27 is greater than the diameter of the large-diameter portion 51 of the rotary tool 50. The metal material of the projections 17 and 27 serve as the source material for filling the gap formed at the abutted portion.

The abutted end surface of the hollow member 10 (the surface of the recessed portion disposed along the thickness direction of the hollow member 10 (the surface substantially orthogonal to the face plates 11 and 12, disposed along center line C)) is provided with grooves 18, 18 disposed along the longitudinal direction of the hollow shape member 10. The abutted end surface of the hollow shape member 20 (the surface substantially orthogonal to the face plates 21 and 22, disposed along center line C) is provided with projections 28, 28 disposed along the longitudinal direction of the hollow shape member 20. The projections 28, 28 fit into the grooves 18, 18.

In order for the projections 28 to be easily inserted to the grooves 18, the grooves 18 and the projections 28 are formed in trapezoidal shapes. The projection 28 is designed so that the end portion thereof is smaller in width than the base portion. The groove 18 is designed so that the bottom portion thereof is smaller in width than the opening portion. All the corners of the groove 18 and the projection 28 are rounded. The sizes of the projections 28 and the grooves 18 are determined so that when the hollow shape members are assembled, the gap formed between the projection and the groove is very small. Especially the gap formed between the groove 18 and the projection 28 in the thickness direction of the hollow shape members 10 and 20 should be very small. It is preferable that the groove 18 and the projection 28 are in contact with each other in the thickness direction of the hollow shape members 10 and 20.

The position of the groove 18 (projection 28) in the thickness direction of the hollow member 10 (20) should be set within the total range of thickness of the face plate 11 or 12 (21 or 22) and the projections 17, 17 (27, 27).

The plate thickness of the face plates 11, 12, 21 and 22 at the abutted portions is thicker than the other areas. Since the outer surface in the thickness direction of the hollow shape members should substantially be flat, the plate thickness is increased by forming a protruded area projecting to the inner side of the face plates. The thickness of the protrusion is reduced gradually as it recedes from the abutted portion. The bottom surface of the recessed portion is substantially parallel to the outer surfaces of the surface plates 11, 12 and 21, 22.

Figure 1:
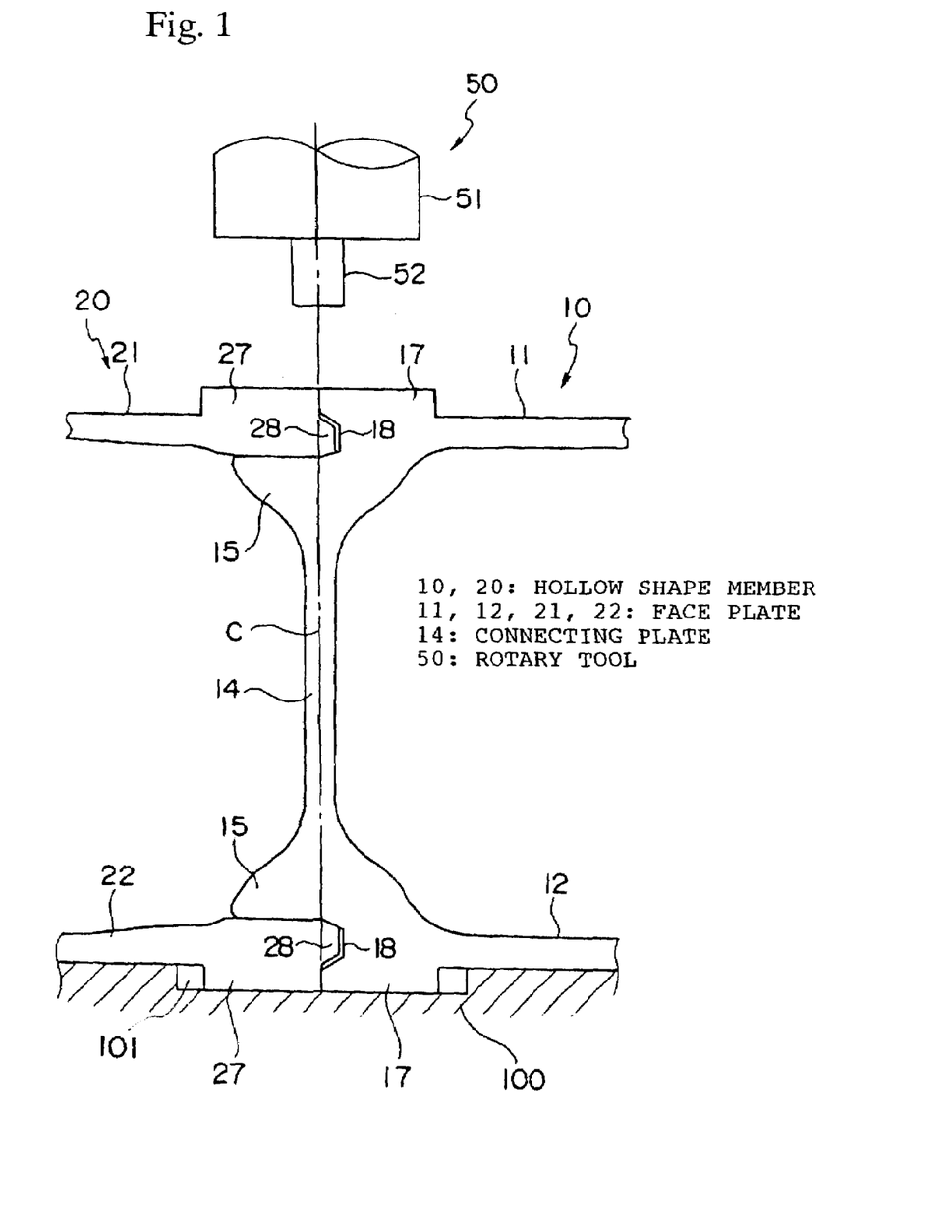
FIG. 1 is a vertical cross-sectional view of the joint region of the hollow shape members according to one embodiment of the present invention.

Upon welding the hollow shape members 10 and 20, the two members are assembled to fit to each other as shown in FIG. 1. The projections 28, 28 are inserted to the grooves 18, 18. Since the grooves 18 are opened toward the width-direction-end of the hollow member and the projections 28 are protruded toward the width-direction-end of the hollow member, they fit into one another easily.

After assembly, the hollow shape members 10 and 20 are fixed immovably on a bed 100. Reference number 101 shows a groove into which the projections 17 and 27 positioned on the lower surface of the members 10 and 20 enter. After fixing the members, the upper surface of the abutted region is temporarily welded intermittently.

The rotary tool 50 is equipped with a small-diameter portion 52 formed on the end of a large-diameter portion 51. The small-diameter portion 52 is provided with a screw thread. Upon welding the members, the rotary tool 50 is inserted to the abutted region. The central axis of the rotary tool 50 is positioned on the extension of the plate thickness center C of the connecting plate 14. The lower end of the large-diameter portion 51 is disposed between the extension of the outer surface of the face plates 11 and 21 (12 and 22) and the upper surface of the projections 17 and 27 (17 and 27). The small-diameter portion 52 is inserted to the abutted region between the face plate 11 (12) and the face plate 21 (22). The lower end of the small-diameter portion 52 is inserted somewhat deeper than the upper surface of the protruding block 15 (bottom surface of the recess). At a minimum, the small-diameter portion 52 should be inserted to a depth enabling the protruded block 15 to be plasticized.

When the central axis of the rotary tool 50 is disposed on the extension of the plate thickness center C of the connecting plate 14, the groove 18 is positioned within the diameter range of the small-diameter portion 52. The projection 28 is also positioned within the diameter range of the small-diameter portion 52. While maintaining this condition, the rotary tool 50 is rotated and moved along the joint line of the abutted region.

When friction stir welding of one side surface is finished, the hollow shape members 10 and 20 are turned upside down, and friction stir welding is similarly performed to the other side.

Next, the projections 17 and 27 positioned on the outer surface of the car body 500 is cut off so that the outer surface of the joint is flush with the outer wall of the face plates 11 and 21 (12 and 22).

According to the present invention, even if the face plate 21 (22) is softened by the friction heat generated by the friction stir welding that may lead to deformation, the movement of the faceplate 21 (22) in the vertical direction is either prevented or suppressed by the present structure where the projections 28 fit into the grooves 18. Therefore, a weld having minimum unevenness is realized at the joint between the face plates 11 (12) and 21 (22).

According to the above-mentioned method, less work is required to cut off any uneven bumps formed after the friction stir welding to the joint region. Therefore, the present invention can be performed at a low cost. Moreover, it is possible to omit in advance a connecting plate disposed on the end region of the hollow shape member 20 orthogonal to the face plates 21 and 22. Thus, a light-weight hollow member 20 can be manufactured at a low cost.

When placing the central axis of the rotary tool 50 on the extension of the plate thickness center C of the connecting plate 14, the groove 18 is disposed within the diameter range of the small-diameter portion 52. The projection 28 is also disposed within the diameter range of the small-diameter portion 52. Therefore, even when there is a gap formed between the groove 18 and the projection 28, the gap can be filled when welding the joint region. The position and size of the groove 18 and the projection 28 are determined so that even if the groove 18 and the projection 28 are not disposed within the diameter range of the small-diameter portion 52, the groove 18 and the projection 28 are plasticized by the rotation of the small-diameter portion.

Since the rotary tool 50 is placed on the extension of the plate thickness of the connecting plate 14, the load provided to the members at the time of friction stir welding is supported by the connecting plate 14, and the deformation of the joint region is minimized. The connecting plate 14 is formed to provide enough rigidity to support such load. It is best that the central axis of the rotary tool 50 be positioned on the extension of the plate thickness center C of the connecting plate 14.

Since a portion of the groove 18 and projection 28 is formed in the projections 17 and 27 disposed outside of the extension of the outer surface of the face plates 11, 21, 12 and 22 excluding the projected portions of projections 17 and 27 (the portion of the projections 17 and 27 that stick out beyond the outer surface), it is easy to form a groove 18 and a projection 28 having a determined size.

It is preferred that the central axis of the rotary tool 50 and the ends of the projections 17 and 27 are substantially disposed along the extension of the center line C of plate thickness of the connecting plate 14.

According to the above-mentioned embodiment, the groove 18 is formed to the recessed portion on the hollow shape member 10, and the projection 28 is formed on the hollow shape member 20, but it is also possible to provide a projection 28 to the recessed portion of the hollow shape member 10 and to provide a groove 18 to the ends of face plates 21 and 22 of the hollow shape member 20. However, it is considered that the former design is easier to realize a precise shape when creating the members by extrusion.

Moreover, it is possible to provide a groove 18 to the side of one face plate 11 (one recessed portion) and provide a projection 28 to the side of the other face plate 12 (the other recessed portion), and to provide a projection 28 to one face plate 21 and provide a groove 18 to the other face plate 22.

Figure 4:
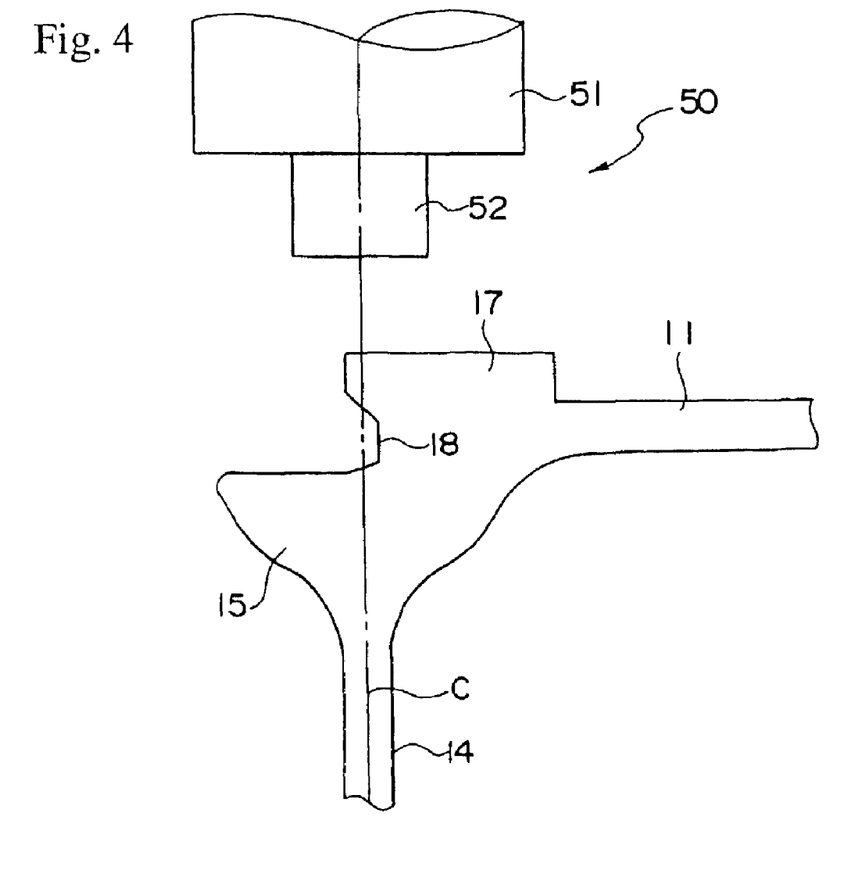
FIG. 4 is a vertical cross-sectional view showing the joint region of the hollow shape member 10 according to another embodiment of the invention.
Figure 5:
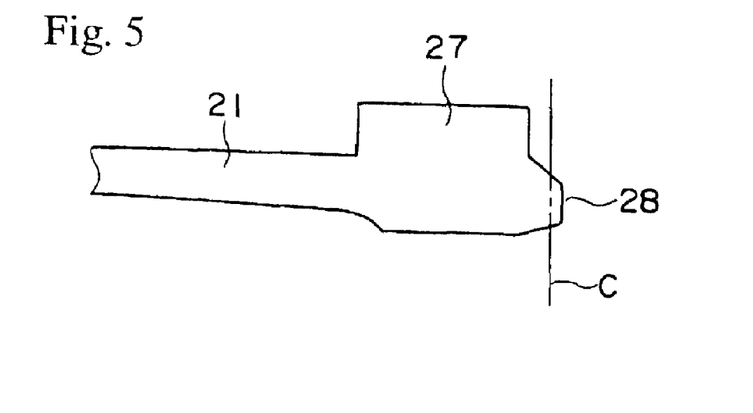
FIG. 5 is a vertical cross-sectional view showing the joint region of the hollow shape member 20 used in the joint region of FIG. 4.

The embodiment shown in FIGS. 4 and 5 will now be explained. The center of depth of the groove 18 is disposed on the extension of the plate thickness center C of the connecting plate 14. Therefore, the end surface of the face plates 11, 12 and the projection 17 at the abutting region is protruded toward the end of the hollow shape member 10 from the plate thickness center C of the connecting plate 14. The abutting region of the hollow member 20 is formed correspondingly. In other words, the end surface of the face plates 21 and 22 and the projection 27 at the abutting region (excluding the projection 28) protrudes toward the other end side of the width direction of the hollow shape member 10 from the plate thickness center C of the connecting plate 14. Therefore, the width of the projection 17 is wider than that of the projection 27.

Friction stir welding is performed while the central axis of the rotary tool 50 is disposed on the extension of the plate thickness center C of the connecting plate 14. Upon friction stir welding, the position of the abutted region between projections 17 and 27 is detected, and the position of the rotary tool 50 is determined based thereon, the position being biased for a predetermined distance toward the hollow shape member 10 from the abutted region.

Accordingly, the allowance of the deviation range of the central axis position of the rotary tool 50 (small-diameter portion 52) against the groove 18 and projection 28 is increased.

It is preferred that the central axis of the rotary tool 50 and the center of depth of the groove 18 are substantially disposed on the extension of the plate thickness center C of the connecting plate 14.

Each preferred embodiment of the present invention requires a connecting plate 14 to support the load added to the welded members when friction stir welding is performed. However, if a support member capable of supporting such load is arranged in the space defined by the face plates 11, 12, 21, and 22 and the connecting plates 13 and 23, the connecting plate 14 becomes unnecessary, and can be omitted. The position of the width-direction-ends of the hollow shape members 10 and 20 (the position of the grooves 18 and projections 28, in other words, the position of the abutted region) are substantially the same. The support member is mounted for example on the lower face plates 12, 22.

The technical scope of the present invention is not restricted by the terms used in the claims or in the summary of the present invention, and is extended to the range in which a person in the art could easily substitute based on the present disclosure.

The present invention enables to realize a light-weight friction stir weld having good quality.

What is claimed is:

1. A hollow shape member for friction stir welding, extending in a thickness direction and in a width direction, and capable of being friction stir welded to a second hollow shape member having projections or grooves extending in the width direction, comprising:
   two face plates, each having respective end portions extending inward from ends of the two face plates in the width direction of the hollow shape member, each of the two face plates having a thickness in the thickness direction of the hollow shape member;
   a first connecting plate for connecting said two face plates, one end of which is connected to a location of one of the two face plates other than at an end portion, of the respective end portions, in the width direction of the hollow shape member;
   a second connecting plate for connecting said respective end portions of said two face plates, disposed substantially orthogonal to said face plates;
   recessed portions provided respectively to each connecting portion where said two face plates are connected with said second connecting plate, each recessed portion opening outward toward both the width direction and the thickness direction of said hollow shape member; and grooves opening outwardly in the width direction, or projections protruding outwardly in the width direction, formed at said recessed portions, respectively, wherein said grooves of said hollow shape member are capable of having projections of the second hollow shape member positioned in said grooves, and said projections of said hollow shape member are capable of being positioned in grooves of the second hollow shape member, when the hollow shape member and the second hollow shape member abut each other for the friction stir welding.

2. A hollow shape member for friction stir welding according to claim 1, wherein:
   second projections are provided to the end portion with said recessed portion of a first face plate and to the end portion with said recessed portion of a second face plate, respectively, each second projection protruding outward so as to have a height in the thickness direction of the hollow shape member; and
   a portion of said grooves or a portion of said projections is disposed within the height of each second projection, respectively.

3. A hollow shape member for friction stir welding according to claim 1, wherein said grooves of said hollow shape member extend in the width direction from a boundary edge of the recessed portions, said boundary edge forming a boundary of the recessed portions in the width direction, and wherein said projections protrude outwardly in the width direction within said recessed portions, from said boundary edge.

4. A hollow shape structure having a first hollow shape member friction stir welded to a second hollow shape member, formed (1) by abutting an end, in a width direction, of the first hollow shape member, to an end, in the width direction, of the second hollow shape member, to provide abutting ends of the first and second hollow shape members, and (2) by friction stir welding the abutting ends, wherein:
   the first hollow shape member, extending in a thickness direction and the width direction, comprises:
   first and second face plates, each having respective end portions extending inward from ends of the first and second face plates in the width direction of the first hollow shape member, each of the first and second face plates having a thickness in the thickness direction of the first hollow shape member,
   a first connecting plate for connecting said first and second face plates, one end of which is connected to a location of one of the first and second face plates other than at an end portion, of the respective end portions, in the width direction of the first hollow shape member,
   a second connecting plate for connecting said respective end portions of said first and second face plates, disposed substantially orthogonal to said first and second face plates,
   recessed portions provided respectively to each connecting portion where said first and second face plates are connected with said second connecting plate, each recessed portion opening outward toward both the width direction and the thickness direction of said first hollow shape member, and
   grooves opening outwardly in the width direction, or projections protruding outwardly in the width direction, formed at said recessed portions, respectively;
   the second hollow shape member, extending in the thickness direction and the width direction, comprises:
   third and fourth face plates, each having respective end portions extending inward from ends of the third and fourth face plates in the width direction of the second hollow shape member, each of the third and fourth face plates having a thickness in the thickness direction of the second hollow shape member,
   a third connecting plate, closest to ends of the third and fourth face plates forming an end of the second hollow shape member, for connecting said third and fourth face plates of the second hollow shape member, one end of said third connecting plate being connected to a location of one of the third and fourth face plates other than said end portion of said one of the third and fourth face plates,
   a projection or groove formed at one face plate, of the third and fourth face plates, at said end portion thereof, and
   a projection or groove formed at the other face plate, of the third and fourth face plates, at said end portion thereof; and
   said projections of the first and second hollow shape members are each inserted into a corresponding groove in the other of the first and second hollow shape members, when the ends of the first and second hollow shape members are abutted against each other.

5. A hollow shape member for friction stir welding, extending in a thickness direction and in a width direction, and capable of being friction stir welded to a second hollow shape member having projections or grooves extending in the width direction, comprising:
   two face plates, each having respective end portions extending inward from ends of the two face plates in the width direction of the hollow shape member, each of the two face plates having a thickness In the thickness direction of the hollow shape member;
   a connecting plate closest to the ends of the two face plates forming an end of the hollow shape member, for connecting said two face plates of the hollow shape member, one end of said connecting plate being connected to a location of one of the two face plates other than said end portion of said one of the two face plates;
   a projection or groove formed to one face plate at said end portion thereof; and
   a projection or groove formed to the other face plate at said end portion thereof, wherein said grooves of said hollow shape member are capable of having projections of the second hollow shape member positioned in said grooves, and said projections of said hollow shape member are capable of being positioned in grooves of the second hollow shape member, when the hollow shape member and the second hollow shape member abut each other for the friction stir welding.

6. The hollow shape member according to claim 5, wherein said connecting plate is sloped against the face plates.

7. The hollow shape member according to claim 5, wherein a projecting portion is provided at the end portion of the two face plates, extending in the thickness direction of the hollow shape member outward from the hollow shape member.

8. The hollow shape member according to claim 5, wherein the hollow shape member has no connecting plate extending between the end portions of the two face plates.

9. A hollow shape member for friction stir welding, extending in a thickness direction and in a width direction, comprising:
   two face plates, each having respective end portions extending inward from ends of the two face plates in the width direction of the hollow shape member, each of the two face plates having a thickness in the thickness direction of the hollow shape member;
a first connecting plate for connecting said two face plates, one end of which is connected to a location of one of the two face plates other than at an end portion, of the respective end portions, in the width direction of the hollow shape member;
a second connecting plate for connecting said respective end portions of said two face plates, disposed substantially orthogonal to said face plates;
recessed portions provided respectively to each connecting portion where said two face plates are connected with said second connecting plate, each recessed portion opening outward toward both the width direction and the thickness direction of said hollow shape member, wherein each connecting portion is provided with a protruding block for supporting another hollow shape member to be friction stir welded to said hollow shape member, during the friction stir welding; and
grooves opening outwardly in the width direction, or projections protruding outwardly in the width direction, formed at said recessed portions, respectively,
wherein said grooves or said projections are spaced from said protruding block.

10. A hollow shape member for friction stir welding, extending in a thickness direction and in a width direction, comprising:
two face plates, each having respective end portions extending inward from ends of the two face plates in the width direction of the hollow shape member, each of the two face plates having a thickness in the thickness direction of the hollow shape member;
a first connecting plate for connecting said two face plates, one end of which is connected to a location of one of the two face plates other than at an end portion, of the respective end portions, in the width direction of the hollow shape member;
a second connecting plate for connecting said respective end portions of said two face plates, disposed substantially orthogonal to said face plates;
recessed portions provided respectively to each connecting portion where said two face plates are connected with said second connecting plate, each recessed portion opening outward toward both the width direction and the thickness direction of said hollow shape member; and
grooves opening outwardly in the width direction, formed at said recessed portions.

11. A hollow shape member for friction stir welding, extending in a thickness direction and in a width direction, comprising:
two face plates, each having respective end portions extending inward from ends of the two face plates in the width direction of the hollow shape member, each of the two face plates having a thickness in the thickness direction of the hollow shape member;
a first connecting plate for connecting said two face plates, one end of which is connected to a location of one of the two face plates other than at an end portion, of the respective end portions, in the width direction of the hollow shape member;
a second connecting plate for connecting said respective end portions of said two face plates, disposed substantially orthogonal to said face plates;
recessed portions provided respectively to each connecting portion where said two face plates are connected with said second connecting plate, each recessed portion opening outward toward both the width direction and the thickness direction of said hollow shape member; and
grooves opening outwardly in the width direction, or projections protruding outwardly in the width direction, formed at said recessed portions, respectively,
wherein said grooves of said hollow shape member extend in the width direction from a boundary edge of the recessed portions, said boundary edge forming a boundary of the recessed portions in the width direction, and wherein said projections protrude outwardly in the width direction within said recessed portions, from said boundary edge.

12. A hollow shape member for friction stir welding, extending in a thickness direction and in a width direction, comprising:
two face plates, each having respective end portions extending inward from ends of the two face plates in the width direction of the hollow shape member, each of the two face plates having a thickness in the thickness direction of the hollow shape member;
a first connecting plate for connecting said two face plates, one end of which is connected to a location of one of the two face plates other than at an end portion, of the respective end portions. In the width direction of the hollow shape member;
a second connecting plate for connecting said respective end portions of said two face plates, disposed substantially orthogonal to said face plates;
recessed portions provided respectively to each connecting portion where said two face plates are connected with said second connecting plate, each recessed portion opening outward toward both the width direction and the thickness direction of said hollow shape member; and
grooves opening outwardly in the width direction, formed at said recessed portions, or projections protruding outwardly in the width direction, formed within said recessed portions, respectively.

13. A hollow shape member for friction stir welding, extending in a thickness direction and In a width direction, comprising:
two face plates, each having respective end portions extending inward from ends of the two face plates in the width direction of the hollow shape member, each of the two face plates having a thickness in the thickness direction of the hollow shape member;
a first connecting plate for connecting said two face plates, one end of which is connected to a location of one of the two face plates other than at an end portion, of the respective end portions, in the width direction of the hollow shape member;
a second connecting plate for connecting said respective end portions of said two face plates, disposed substantially orthogonal to said face plates;
recessed portions provided respectively to each connecting portion where said two face plates are connected with said second connecting plate, each recessed portion opening outward toward both the width direction and the thickness direction of said hollow shape member; and
projections protruding outwardly in the width direction, formed within said recessed portions.

* * * * *